United States Patent
Zhou et al.

(10) Patent No.: US 9,949,343 B2
(45) Date of Patent: Apr. 17, 2018

(54) ILLUMINATION CONTROL METHODS AND APPARATUSES AND DEVICES HAVING PHOTOGRAPHING FUNCTION

(71) Applicant: Beijing Zhigu Rui Tuo Tech Co., Ltd, Beijing (CN)

(72) Inventors: Liang Zhou, Beijing (CN); Ran Xu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/324,697

(22) PCT Filed: Jul. 9, 2015

(86) PCT No.: PCT/CN2015/083639
§ 371 (c)(1),
(2) Date: Jan. 7, 2017

(87) PCT Pub. No.: WO2016/004883
PCT Pub. Date: Jan. 14, 2016

(65) Prior Publication Data
US 2017/0202075 A1 Jul. 13, 2017

(30) Foreign Application Priority Data
Jul. 10, 2014 (CN) .......................... 2014 1 0329433

(51) Int. Cl.
*H05B 37/02* (2006.01)
*G06T 7/90* (2017.01)
*G06K 9/20* (2006.01)

(52) U.S. Cl.
CPC ....... *H05B 37/0227* (2013.01); *G06K 9/2027* (2013.01); *G06T 7/90* (2017.01)

(58) Field of Classification Search
CPC ..... H05B 37/0227; G06T 7/90; G06K 9/2027
(Continued)

(56) References Cited

U.S. PATENT DOCUMENTS 9,104,937 B2 * 8/2015 Kim ..................... G06K 9/2027
9,363,857 B2 6/2016 Feri et al.
(Continued)

FOREIGN PATENT DOCUMENTS

CN 101810058 A 8/2010
CN 103237177 A 8/2013
(Continued)

OTHER PUBLICATIONS

International Search Report for PCT Application No. PCT/CN2015/083639, dated Oct. 22, 2015, 3 pages.

*Primary Examiner* — Dylan White
(74) *Attorney, Agent, or Firm* — Amin, Turocy & Watson, LLP

(57) ABSTRACT

Illumination control methods and apparatuses and various devices having a photographing function are disclosed. An example illumination control method comprises: determining a to-be-adjusted region that needs optical parameter adjustment in a photograph framing image; determining, according to light source modulation information carried in received imaging rays corresponding to the to-be-adjusted region, at least one external light source that needs to be illumination controlled; determining illumination control instruction information of the to-be-adjusted region; and sending the illumination control instruction information to the at least one external light source determined, so as to instruct the at least one external light source to perform at least one optical adjustment according to the illumination control instruction information. Imaging quality and photographing effect can be improved thereby.

28 Claims, 5 Drawing Sheets

(58) Field of Classification Search
USPC .......................................................... 315/158
See application file for complete search history.

(56) References Cited

U.S. PATENT DOCUMENTS

| | | | |
|---|---|---|---|
| 9,379,814 B2 | 6/2016 | De Bruijn et al. | |
| 9,497,393 B2* | 11/2016 | Reed | H05B 37/0227 |
| 9,655,207 B2* | 5/2017 | Monaci | H05B 37/0227 |
| 2006/0269270 A1 | 11/2006 | Yoda et al. | |
| 2009/0202236 A1* | 8/2009 | Hama | G03B 7/16 |
| | | | 396/180 |
| 2010/0194291 A1* | 8/2010 | Ishiwata | H05B 37/02 |
| | | | 315/153 |
| 2012/0262571 A1* | 10/2012 | Wang | H04N 5/2354 |
| | | | 348/135 |
| 2012/0281987 A1 | 11/2012 | Schenk et al. | |
| 2013/0120636 A1* | 5/2013 | Baer | G03B 15/05 |
| | | | 348/335 |
| 2013/0266327 A1 | 10/2013 | Bae et al. | |
| 2013/0314581 A1 | 11/2013 | Kido | |
| 2014/0375217 A1* | 12/2014 | Feri | H05B 37/0272 |
| | | | 315/151 |
| 2016/0068097 A1* | 3/2016 | Langkabel | B60Q 1/1423 |
| | | | 362/464 |
| 2016/0270181 A1* | 9/2016 | Yagi | H05B 33/0863 |
| 2017/0202069 A1* | 7/2017 | Hidaka | H05B 33/0851 |

FOREIGN PATENT DOCUMENTS

| | | |
|---|---|---|
| CN | 103428568 A | 12/2013 |
| CN | 103430626 A | 12/2013 |
| CN | 104092953 A | 10/2014 |
| GB | 2459506 A | 10/2009 |
| TW | 201229645 A | 7/2012 |
| WO | 2012063177 A2 | 5/2012 |
| WO | 2013108166 A1 | 7/2013 |

* cited by examiner

ILLUMINATION CONTROL METHODS AND APPARATUSES AND DEVICES HAVING PHOTOGRAPHING FUNCTION

RELATED APPLICATION

The present application is a U.S. National Stage filing under 35 U.S.C. § 371 of international patent cooperation treaty (PCT) application No. PCT/CN2015/083639, filed Jul. 9, 2015, and entitled "ILLUMINATION CONTROL METHODS AND APPARATUSES AND DEVICES HAVING PHOTOGRAPHING FUNCTION", which claims the benefit of priority to Chinese Patent Application No. 201410329433.1, filed on Jul. 10, 2014, which applications are hereby incorporated into the present application by reference herein in their respective entireties.

TECHNICAL FIELD

The present application relates to the field of optical control, and in particular, to various illumination control methods and apparatuses and various devices having a photographing function.

BACKGROUND

At present, photographing technologies are becoming increasingly popular. Many people select to record details of life by photographing and also have an increasingly higher requirement for a photographing effect.

Some devices having a photographing function, such as a camera and a mobile terminal having a camera, improve a photographing effect in an environment with poor light by means of, for example, in-building a flash lamp or disposing a light-compensating lamp beside a camera.

However, because a level of improvement in a photographing effect that is brought about by self adjustment capability of a photographing device is inevitably limited, how to assist to improve a photographing effect by using other methods has been drawing high attention of more and more researchers.

SUMMARY

The following text provides a brief overview of the present application, so as to provide a basic understanding of some aspects of the present application. It should be understood that the overview is not an exhaustive overview of the present application. The overview neither is intended to determine a critical or important part of the present application, nor is intended to define the scope of the present application. The objective of the overview is to provide some concepts in a simplified form, so as to use the concepts as preorders for more detailed description discussed latter.

The present application provides various illumination control methods and apparatuses and various devices having a photographing function.

In one aspect, example embodiments of the present application provide an illumination control method, comprising:

determining a to-be-adjusted region that needs optical parameter adjustment in a photograph framing image;

determining, according to light source modulation information carried in received imaging rays corresponding to the to-be-adjusted region, at least one external light source that needs to be illumination controlled;

determining illumination control instruction information of the to-be-adjusted region; and sending the illumination control instruction information to the at least one external light source determined, so as to instruct the at least one external light source to perform at least one optical adjustment according to the illumination control instruction information.

In another aspect, example embodiments of the present application further provide an illumination control apparatus, comprising:

a to-be-adjusted region determining module, configured to determine a to-be-adjusted region that needs optical parameter adjustment in a photograph framing image;

an external light source determining module, configured to determine, according to light source modulation information carried in received imaging rays corresponding to the to-be-adjusted region, at least one external light source that needs to be illumination controlled;

an illumination control instruction information determining module, configured to determine illumination control instruction information of the to-be-adjusted region; and an illumination control instructing module, configured to send the illumination control instruction information to the at least one external light source determined, so as to instruct the at least one external light source to perform at least one optical adjustment according to the illumination control instruction information.

Further, in another aspect, example embodiments of the present application provide a device having a photographing function, comprising the illumination control apparatus.

In one or more of the technical solutions provided by the example embodiments of the present application, the illumination control apparatus determines, according to light source modulation information carried in received imaging rays corresponding to a to-be-adjusted region that needs optical parameter adjustment in a photograph framing image, external light sources that need to be illumination controlled in a photographing process. These external light sources influence imaging quality of the to-be-adjusted region. Illumination control instruction information is sent to these external light sources to instruct the external light sources to perform corresponding optical adjustment, to improve the imaging quality of the to-be-adjusted region. Technical solutions provided by example embodiments of the present application have strong universality, and can be used as, but not limited to, illumination auxiliary control solutions of photographing by a device having a photographing function. An optical environment of a framed target can be regulated by performing specific illumination control on a determined external light source, thereby improving a photographing effect.

The described and other advantages of the present application become more obvious through detailed description of the optional embodiments of the present application in combination with the accompanying drawings below.

BRIEF DESCRIPTION OF THE DRAWINGS

A better understanding of the present application can be obtained by referring to the description provided in combination with the accompanying drawings below. The same or similar reference signs are used in the accompanying drawings to donate the same or similar components. The accompanying drawings and the following detailed description are all comprised in the present description and form a part of the present description, and are further used for illustrating the optional embodiments of the present application and interpreting principles and/or advantages of the present application. In the accompanying drawings.

Figure 1:
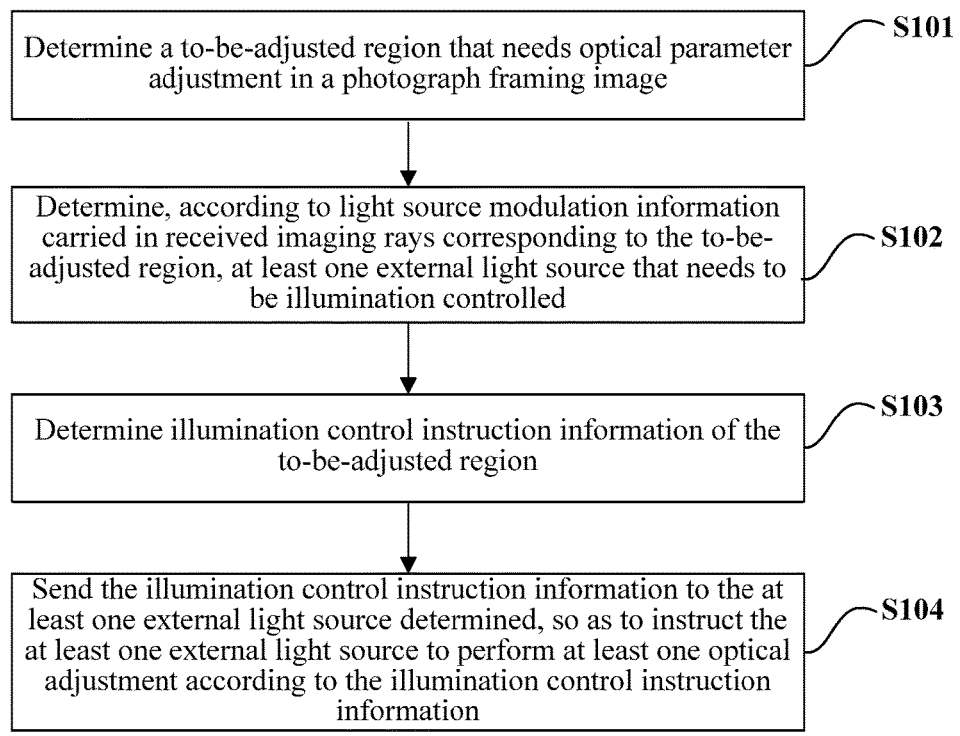
FIG. 1 is a flowchart of an illumination control method provided by an example embodiment of the present application.

It should be understood by a person skilled in the art that the elements in the accompanying drawings are shown only for the sake of briefness and clarity, and are not necessarily drawn in proportion. For example, some elements may be amplified as compared with other elements in the accompanying drawings, so as to facilitate improvement in the understanding of the example embodiments of the present application.

DETAILED DESCRIPTION

Example embodiments of the present application are described in detail with reference to the accompanying drawings below. For the sake of clarify and briefness, not all features of actual embodiments are described in the description. However, it should be understood that many implementation-specific decisions can be made in a process of developing any of the actual embodiments, so as to achieve a specific objective of a developer. For example, the limiting conditions relevant to systems and services are satisfied, and these limiting conditions may change along with differences of the embodiments. In addition, it should also be understood that although the developing work may be rather complicated and time consuming, the developing work is only a routine task for a person skilled in the art who benefits from the present disclosure.

Herein, it further should be noted that only apparatus structures and/or processing steps closely related to the solutions of the present application are described in the accompanying drawings and description, and representation and description of components and processing that are not so closely associated with the present application and are known to a person of ordinary skill in the art are omitted, so as to prevent unnecessary details from blurring the present application.

Example embodiments of the present application are further described in detail below with reference to the accompanying drawings (in which like elements are denoted by like reference numerals) and embodiments. The following embodiments are intended to describe the present application, but not to limit the scope of the present application.

It should be understood by a person skilled in the art that the terms such as "first" and "second" in the present application are only used for distinguishing different steps, devices, or modules, and they neither represent any specific technical meanings, nor represent a necessary logic sequence of the steps, devices, or modules.

FIG. 1 is a flowchart of an illumination control method provided by the embodiments of the present application. The illumination control method provided in the present application is used to perform illumination control on a photographing environment in a photographing process. The illumination control method may be executed by a certain illumination control apparatus. The illumination control apparatus performs illumination control on a photographing environment by executing the illumination control method in a photographing process. The device representation form of the illumination control apparatus is not limited. For example, the illumination control apparatus may be a certain independent component and the component is in coordination and communication with a device having a photographing function; alternatively, the illumination control apparatus may be integrated as a certain functional module in a device having a photographing function, which is not limited in the embodiments of the present application. Specifically, as shown in FIG. 1, an illumination control method provided by the embodiments of the present application comprises:

S101: Determine a to-be-adjusted region that needs optical parameter adjustment in a photograph framing image.

The photograph framing image is an image framed by a device having a photographing function in a photographing process, for example, an image that is framed and obtained by a camera, a vidicon, or a mobile terminal having an imaging component such as a camera by using a device framer having a photographing function or the like in a photographing process. A broad understanding of the photographing process should be established, that is, the photographing process comprises a shooting process for obtaining a non-dynamic image, and also comprises a shooting process for obtaining a certain frame of an image in a dynamic image.

The optical parameter is one or more parameters having an optical influence on imaging quality of an image. For example, the optical parameter may comprise, but not limited to, contrast, intensity of illumination, luminance, and color temperature.

The to-be-adjusted region is a part that needs optical parameter adjustment determined in the photograph framing image. A proportion of the to-be-adjusted region in the photograph framing image is determined according to actual needs. For example: if the entire photograph framing image needs optical parameter adjustment, the to-be-adjusted region may be the photograph framing image itself; and if a part of the photograph framing image needs optical parameter adjustment, the part of the photograph framing image may be used as the to-be-adjusted region, which is not limited in the embodiments of the present application.

S102: Determine, according to light source modulation information carried in received imaging rays corresponding to the to-be-adjusted region, at least one external light source that needs to be illumination controlled.

The external light source may comprise, but not limited to, a lighting source. The quantity of the external light sources that need to be illumination controlled may be one or above. The external light source modulates information such as a light source identifier and a ray wavelength in rays emitted by the external light source.

In a photographing process, external rays irradiated on a photographed target are reflected into a device having a photographing function for imaging. These rays for imaging might as well be referred to as imaging rays. The imaging rays carry light source modulation information such as a light source identifier and a ray wavelength. A sensor of the device having a photographing function receives the rays reflected by the part, analyzes the light source modulation information carried in the imaging rays of the to-be-adjusted region to obtain a mapping between an image pixel of the to-be-adjusted region and an external light source, and determines, according to the mapping, one or more external light sources that need to be illumination controlled.

Figure 2:
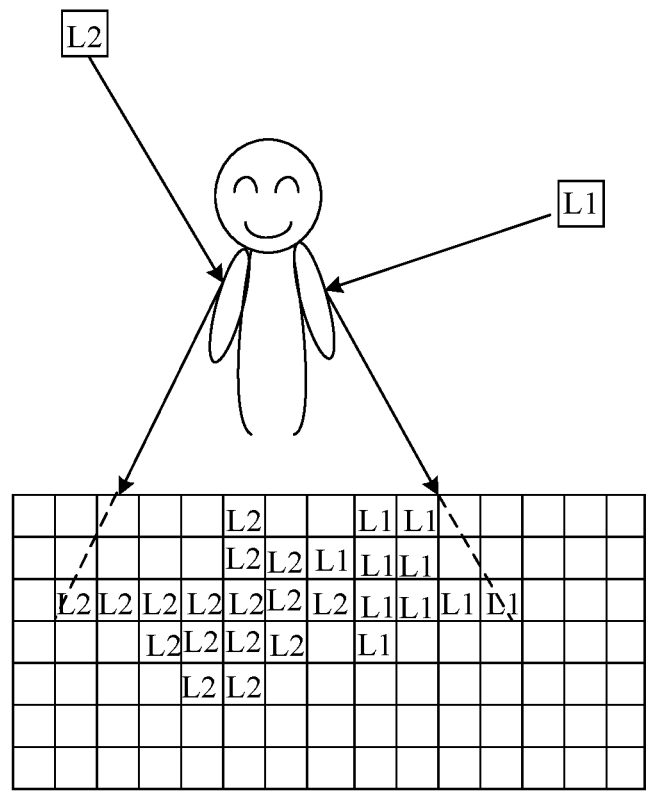
FIG. 2 is an example scenario that reflects a correspondence between a pixel of a to-be-adjusted region and an external light source.

An optional scenario is shown in FIG. 2, among rays irradiated on a framed target (for example, a human body) by external light sources L1 and L2, rays reflected by the framed target are received by sensors of a device having a photographing function. Distribution of the sensors of the device having a photographing function is corresponding to that of pixels of a photograph framing image, to cause that an external light source that needs to be illumination controlled can be determined by analyzing light source modulation information (for example, a light source identifier) carried in imaging rays corresponding to the to-be-adjusted region. The quantity of external light sources that need to be illumination controlled may be one or above. In a case in which the quantity of external light sources that need to be illumination controlled is greater than one, an external light source having a greater influence on the to-be-adjusted region may be further determined according to a certain screening condition and used as an external light source that needs to be illumination controlled. The screening condition may be set flexibly according to actual needs, which is not limited in the present application. For example: the screening condition may be determined according to received instruction information, for example, may be determined according to instruction information input by a user, thereby satisfying various user needs. For another example: the screening condition may be determined according to first ratios corresponding to different external light sources, for example, an external light source having a greatest first ratio is used as an external light source that needs to be illumination controlled, thereby improving illumination control efficiency. The first ratio is a ratio of a first pixel quantity to a total pixel quantity of the to-be-adjusted region. The first pixel quantity is a total quantity of all pixels of imaging rays that are received in the to-be-adjusted region and corresponding to a certain external light source. For another example: the screening condition may be determined according to offset degrees of pixel distribution of imaging rays corresponding to different external light sources relative to a center of the to-be-adjusted region (that is, centering degrees), and an external light source with a centering degree exceeding a certain set grade is used as an external light source that needs to be illumination controlled, thereby improving illumination control efficiency.

S103: Determine illumination control instruction information of the to-be-adjusted region.

The content of the illumination control instruction information is very flexible. For example, the content of the illumination control instruction information may be determined according to an imaging effect to be achieved in the to-be-adjusted region and/or an influence of the external light source on the imaging effect of the to-be-adjusted region.

S104: Send the illumination control instruction information to the at least one external light source determined, so as to instruct the at least one external light source to perform at least one optical adjustment according to the illumination control instruction information.

The illumination control apparatus may send the illumination control instruction information to the determined external light source in a wired or wireless communication form. The wireless communication form may comprise, but not limited to, visible light communication.

The external light source that receives the illumination control instruction information sent by the illumination control apparatus performs corresponding optical adjustment according to the received illumination control instruction information. Optical adjustment performed on the external light source may be once or multiple times, and until an expected requirement of imaging effect for the to-be-adjusted region is achieved, illumination control on the external light source is ended. Subsequently, a device having a photographing function may estimate an exposure parameter for a framed target in an environment that is illumination controlled, and then perform exposing and photographing.

The illumination control method provided in the embodiments of the present application is used in a photographing process. By using the solution, external light sources that need to be illumination controlled are determined according to light source modulation information carried in received imaging rays corresponding to a to-be-adjusted region that needs optical parameter adjustment in a photograph framing image. These external light sources influence imaging quality of the to-be-adjusted region. Illumination control instruction information is sent to these external light sources to instruct the external light sources to perform corresponding optical adjustment, to improve the imaging quality of the to-be-adjusted region. The technical solution provided by the embodiments of the present application has strong universality, and can be used as, but not limited to, a illumination auxiliary control solution of photographing by a device having a photographing function. An optical environment of a framed target is regulated by performing specific illumination control on a determined external light source, thereby improving a photographing effect.

In the embodiments of the present application, the method of determining the to-be-adjusted region that needs optical parameter adjustment in the photograph framing image is very flexible.

In an optional embodiment, the illumination control apparatus may receive to-be-adjusted region determining information and determines the to-be-adjusted region according to the received to-be-adjusted region determining information. The to-be-adjusted region determining information may be, but not limited to, an adjusted region selecting instruction input by a user. For example, a user selects at least a part of regions from the photograph framing image, and uses the region selected by the user as a to-be-adjusted region. The solution makes it convenient for a user to select, according to actual needs, which regions in the photograph framing image need adjustment, so as to cause the illumination control to match the user requirement better, thereby helping to satisfy various user requirements, improve user's interests of photographing, and improve user's experience.

In another optional embodiment, the illumination control apparatus determines the to-be-adjusted region according to an optical parameter analysis result of the photograph framing image. By using the solution, optical parameter analysis may be performed on the photograph framing image, and the to-be-adjusted region may be determined according to the optical parameter analysis result, thereby implementing automatic illumination control.

Optionally, the photograph framing image comprises at least one detected region. Correspondingly, determining the to-be-adjusted region comprises: determining the to-be-adjusted region according to an optical parameter analysis result of the at least one detected region. The detected region is at least a part of regions of the photograph framing image. A proportion of the detected region in the photograph framing image may be determined according to actual needs. For example, the entire photograph framing image may be used as the detected region, or, the photograph framing image may be divided into a plurality of regions, and at least one region, among the plurality of regions, is used as the detected region, which is not limited in the present application. The solution is simple and easy to implement, has strong universality, and further helps to satisfy various application requirements.

The method for determining the detected region is very flexible, which is not limited in the present application.

Optionally, the detected region may be preset. For example, an image region corresponding to a certain predetermined region in a device framer having a photographing function may be set as the detected region in advance.

Alternatively, the at least one detected region may be determined in the photograph framing image in the photographing process.

For example: the at least one detected region may be determined according to focusing information of the photograph framing image. For example, a region of the photograph framing image that is corresponding to a focusing plane of the device having a photographing function is determined as the detected region. The solution is simple and easy to implement, and helps to improve imaging quality of a focused image.

For another example: characteristic analysis may be performed on the photograph framing image; and the at least one detected region is determined according to a characteristic analysis result of the photograph framing image. For example, characteristic analysis is performed on a photograph framing image. At least one region comprising a human face in the photograph framing image is determined as the detected region. The solution helps to specifically improve imaging quality of a characteristic region in the photograph framing image.

For another example, detected region determining information may be received; and the at least one detected region is determined according to the received detected region determining information. The detected region determining information may be, but not limited to, a detected region selecting instruction input by a user. For example, a user selects at least a part of regions from the photograph framing image and uses the region selected by the user as the detected region. The solution makes it convenient for a user to select, according to actual needs, which regions in the photograph framing image need adjustment, so as to cause determining of whether illumination control needs to be performed on the to-be-adjusted region to match a user requirement better, thereby helping to satisfy various user requirements and improve user's experience.

In the embodiments of the present application, the optical parameter may comprise at least one of the following: contrast, luminance, and color temperature. The to-be-adjusted region may be determined according to an analysis result of the contrast, luminance, and/or color temperature of the photograph framing image or the at least one detected region. The case in which the to-be-adjusted region is determined based on a result of contrast, luminance, or color temperature analysis performed on the detected region is used as an example below for illustration.

In an optional embodiment, the illumination control apparatus may determine the to-be-adjusted region based on a result of luminance analysis of the at least one detected region.

For example: the illumination control apparatus may determine a luminance average value of the at least one detected region. If the luminance average value exceeds a reference luminance range, the at least one detected region is determined as the to-be-adjusted region. Correspondingly, the illumination control apparatus sends the illumination control instruction information to the determined external light source, so as to instruct the external light source to perform luminance adjustment according to the illumination control instruction information, until the luminance average value of the at least one detected region falls within the reference luminance range. The reference luminance range may be predetermined, or may be determined according to a luminance range of at least a part of regions selected from the photograph framing image, which is not limited in the present application. The solution may be used in, but not limited to, scenarios in which photographing is performed in a whole low light environment or a whole luminance offset of the photograph framing image is great (for example, the photograph framing image is obviously darker or brighter). Luminance compensation of the to-be-adjusted region is implemented by specifically adjusting luminance of an external light source having a greater influence on the luminance of the to-be-adjusted region.

For another example: the illumination control apparatus may analyze a luminance distribution situation of a plurality of detected regions. If a luminance difference of different detected regions of a focused detected image exceeds a luminance difference reference range, a detected region having a luminance average value that exceeds the reference luminance range is determined as the to-be-adjusted region. Correspondingly, the illumination control apparatus sends the illumination control instruction information to the determined external light source, so as to instruct the external light source to perform luminance adjustment according to the illumination control instruction information, until the luminance difference value of all the at least one detected region falls within the luminance difference reference range. The luminance difference reference range may be predetermined, or may be determined according to a luminance distribution range of at least a part of regions selected from the photograph framing image, which is not limited in the present application. The solution may be used in, but not limited to, scenarios in which photographing is performed in an uneven irradiation environment (for example, the external light source provides light from a side of the framed target) or the exposure of the photograph framing image is uneven (for example, in a photograph framing image comprising a human face, the human face is partially darker or brighter). Luminance compensation of the to-be-adjusted region is implemented by specifically adjusting luminance of an external light source having a greater influence on the luminance of the to-be-adjusted region.

In another optional embodiment, the illumination control apparatus may determine the to-be-adjusted region based on a result of contrast analysis of the at least one detected region.

For example, the illumination control apparatus may analyze contrast of edges of the at least one detected region. If the contrast of the edges of the at least one detected region exceeds a reference contrast range, the at least one detected region is determined as the to-be-adjusted region. Correspondingly, the illumination control apparatus sends the illumination control instruction information to the determined external light source, so as to instruct the external light source to perform contrast adjustment according to the illumination control instruction information, until the contrast of the edges of the at least one detected region falls within the reference contrast range. The reference contrast range may be predetermined, or may be determined according to a contrast distribution range of at least a part of regions selected from the photograph framing image, which is not limited in the present application. Insufficient contrast may influence focusing of a device having a photographing function. The solution may be used in, but not limited to, scenarios in which photographing is performed in a whole low light environment (for example, exposure of a photograph framing image is obviously insufficient). Contrast adjustment of the to-be-adjusted region is implemented by specifically adjusting luminance or contrast of an external light source having a greater influence on the luminance of the to-be-adjusted region, thereby helping to increase the focusing speed and improve a photographing effect of the device having a photographing function.

In another optional embodiment, the illumination control apparatus may determine the to-be-adjusted region based on a result of color temperature analysis of the at least one detected region.

For example: the illumination control apparatus may determine a color temperature average value of the at least one detected region. If the color temperature average value exceeds a reference color temperature range, the at least one detected region is determined as the to-be-adjusted region. Correspondingly, the illumination control apparatus sends the illumination control instruction information to the determined external light source, so as to instruct the external light source to perform color temperature adjustment according to the illumination control instruction information, until the color temperature average value of the at least one detected region falls within the reference color temperature range. The reference color temperature range may be predetermined, or may be determined according to a color temperature range of at least a part of regions selected from the photograph framing image, which is not limited in the present application. When there is a plurality of external light sources having an influence on the color temperature of the to-be-adjusted region, the color temperature of the to-be-adjusted region is reflected as a hybrid color temperature of the plurality of external light sources. The color temperature of at least one external light source may be adjusted according to a color temperature average value expected to be obtained. For example, a light emitting color of the at least one external light source is adjusted, so as to change the hybrid color temperature of the plurality of external light sources. The external light source may modulate information such as light emitting wavelength in rays emitted by the external light source. The illumination control apparatus may determine, according to the light source modulation information, which light sources are external light sources that need optical adjustment. The solution may be used in, but not limited to, scenarios in which photographing is performed in an environment in which rays are excessively cool or warm or a color temperature offset of at least a part of the photograph framing image is great (for example, in a photograph framing image comprising a human face, a skin color of the human face is quite different from an actual skin color of the human face). Color temperature adjustment of the to-be-adjusted region is implemented by specifically adjusting a light emitting color of an external light source having a greater influence on the color temperature of the to-be-adjusted region.

For another example: the illumination control apparatus may analyze a color temperature distribution situation of a plurality of detected regions. If a color temperature difference of different detected regions of a focused detected image exceeds a color temperature difference reference range, a detected region having a color temperature average value that exceeds the reference color temperature range is determined as the to-be-adjusted region. Correspondingly, the illumination control apparatus sends the illumination control instruction information to the determined external light source, so as to instruct the external light source to perform color temperature adjustment according to the illumination control instruction information, until the color temperature difference value of all the at least one detected region falls within the color temperature difference reference range. The color temperature difference reference range may be predetermined, or may be determined according to a color temperature distribution range of at least a part of regions selected from the photograph framing image, which is not limited in the present application. The solution may be used in, but not limited to, scenarios in which photographing is performed in an uneven irradiation environment (for example, the external light source provides light from a side of the framed target) or the exposure of the photograph framing image is uneven (for example, in a photograph framing image comprising a human face, a skin color of the human face is obviously uneven). Color temperature compensation of the to-be-adjusted region is implemented by specifically adjusting a color temperature of an external light source having a greater influence on the color temperature of the to-be-adjusted region.

In the embodiments of the present application, implementations of determining the to-be-adjusted region based on results of contrast, luminance, or color temperature analysis on the photograph framing image are similar to the aforementioned technical solutions, which are not described herein again. In addition, the results of the contrast, luminance, or color temperature analysis may also be combined and used, in a whole, as a determining basis for determining the to-be-adjusted region, which is not described herein again, either.

In the embodiments of the present application, the method for determining illumination control instruction information of the adjusted region is very flexible.

Optionally, the illumination control apparatus determines the illumination control instruction information according to an optical parameter reference adjustment amplitude. The optical parameter reference adjustment amplitude may be a predetermined optical parameter adjustment step value (for example, a luminance adjustment step value), or a weight of a certain predetermined optical parameter adjustment step value. The external light source may perform optical adjustment according to the optical parameter reference adjustment amplitude once or multiple times, until a illumination control result satisfies a certain illumination control convergence condition. The solution is simple and easy to implement.

Optionally, the illumination control apparatus determines a first ratio of a first pixel quantity to a total pixel quantity of the to-be-adjusted region. The first pixel quantity is a total quantity of all pixels of imaging rays that are received in the to-be-adjusted region and corresponding to the external light source. A first weight is determined according to the first ratio. The illumination control instruction information is determined according to the first weight and an optical parameter reference adjustment amplitude. The first ratio reflects a level of an influence on an optical parameter of the to-be-adjusted region by the external light source. When there is a plurality of external light sources having an influence on the optical parameter of the to-be-adjusted region, by using the solution, different optical adjustment schemes may be determined for different light sources according to the first ratio, thereby improving illumination control efficiency.

Optionally, the illumination control apparatus determines a second weight according to an offset degree of the to-be-adjusted region relative to a center of the photograph framing image and determines the illumination control instruction information according to the second weight and an optical parameter reference adjustment amplitude. A centering degree of the to-be-adjusted region relative to the photograph framing image reflects an influence on the entire photograph framing image by the optical parameter adjustment of the to-be-adjusted region. By using the solution, the second weight may be determined specifically according to different centering degrees of the to-be-adjusted region relative to the photograph framing image, thereby improving illumination control efficiency.

Optionally, the illumination control apparatus determines a third weight according to a photographing mode of the photograph framing image and determines the illumination control instruction information according to the third weight and an optical parameter reference adjustment amplitude. The photographing mode of the photograph framing image is a current photographing mode of a device having a photographing function. The device having a photographing function is in communication connection with the illumination control apparatus, or the device having a photographing function comprises a illumination control apparatus. The photographing mode may be, for example, a normal photographing mode, a portrait photographing mode, or a night photographing mode. Requirements for the image optical parameter by different photographing modes are not exactly the same. By using the solution, the third weight may be specifically determined according to different photographing modes, thereby satisfying various user requirements.

The illumination control apparatus sends the illumination control instruction information to the determined external light source. The external light source that receives the illumination control instruction information sent by the illumination control apparatus may perform optical adjustment according to the illumination control instruction information once or multiple times, so as to cause the optical parameter of the to-be-adjusted region to satisfy a certain requirement.

The case in which the external light source performs optical adjustment multiple times may be, for example: the illumination control apparatus determines an illumination control convergence condition of the to-be-adjusted region; acquires an optical parameter analysis result of the to-be-adjusted region after at least one optical adjustment is performed on the at least one external light source; if a currently acquired optical parameter analysis result of the to-be-adjusted region does not satisfy the illumination control convergence condition, sends the illumination control instruction information to the at least one external light source so as to instruct the at least one external light source to again perform adjustment and repeat the adjustment; and until a latest acquired optical parameter analysis result of the to-be-adjusted region satisfies the illumination control convergence condition, ends optical adjustment control of the at least one external light source. The illumination control convergence condition varies along with differences in an optical parameter to be adjusted and/or adjusted targets. For example, when luminance is adjusted, a luminance average value of the to-be-adjusted region falling within a reference luminance average value range may be used as the illumination control convergence condition. The solution facilitates improvement of adjustment precision and decrease of an error rate by controlling an external light source to perform a plurality of iterative adjustments.

It should be understood that in any method of the embodiments of the present application, the value of the serial number of each step described above does not mean an execution sequence, and the execution sequence of each step should be determined according to the function and internal logic thereof, and should not be any limitation on the embodiments of the present application.

Figure 3:
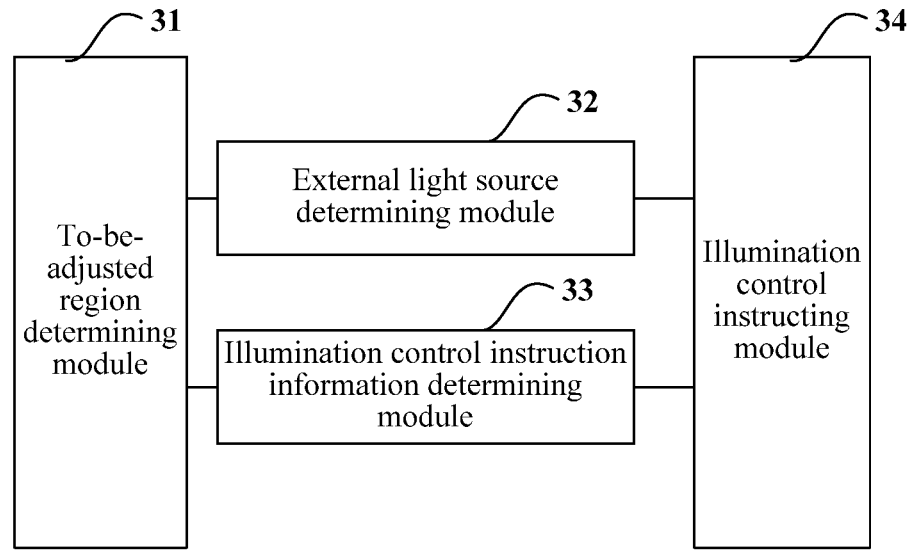
FIG. 3 is a schematic structural diagram of a first illumination control apparatus provided by an example embodiment of the present application.

FIG. 3 is a schematic structural diagram of a first illumination control apparatus provided by the embodiments of the present application. As shown in FIG. 3, a illumination control apparatus provided in the embodiments of the present application comprises: a to-be-adjusted region determining module 31, an external light source determining module 32, an illumination control instruction information determining module 33, and an illumination control instructing module 34.

The to-be-adjusted region determining module 31 is configured to determine a to-be-adjusted region that needs optical parameter adjustment in a photograph framing image.

The external light source determining module 32 is configured to determine, according to light source modulation information carried in received imaging rays corresponding to the to-be-adjusted region, at least one external light source that needs to be illumination controlled.

The illumination control instruction information determining module 33 is configured to determine illumination control instruction information of the to-be-adjusted region.

The illumination control instructing module 34 is configured to send the illumination control instruction information to the at least one external light source determined, so as to instruct the at least one external light source to perform at least one optical adjustment according to the illumination control instruction information.

The illumination control apparatus provided in the embodiments of the present application determines, according to light source modulation information carried in received imaging rays corresponding to a to-be-adjusted region that needs optical parameter adjustment in a photograph framing image, external light sources that need to be illumination controlled in a photographing process. These external light sources influence imaging quality of the to-be-adjusted region. Illumination control instruction information is sent to these external light sources to instruct the external light sources to perform corresponding optical adjustment, to improve the imaging quality of the to-be-adjusted region.

The device representation form of the illumination control apparatus is not limited. For example, the illumination control apparatus may be a certain independent component and the component is in coordination and communication with a device having a photographing function to implement any one of the illumination control methods provided in the embodiments of the present application; alternatively, the illumination control apparatus may be integrated as a certain functional module in a device having a photographing function, which is not limited in the embodiments of the present application.

Figure 4:
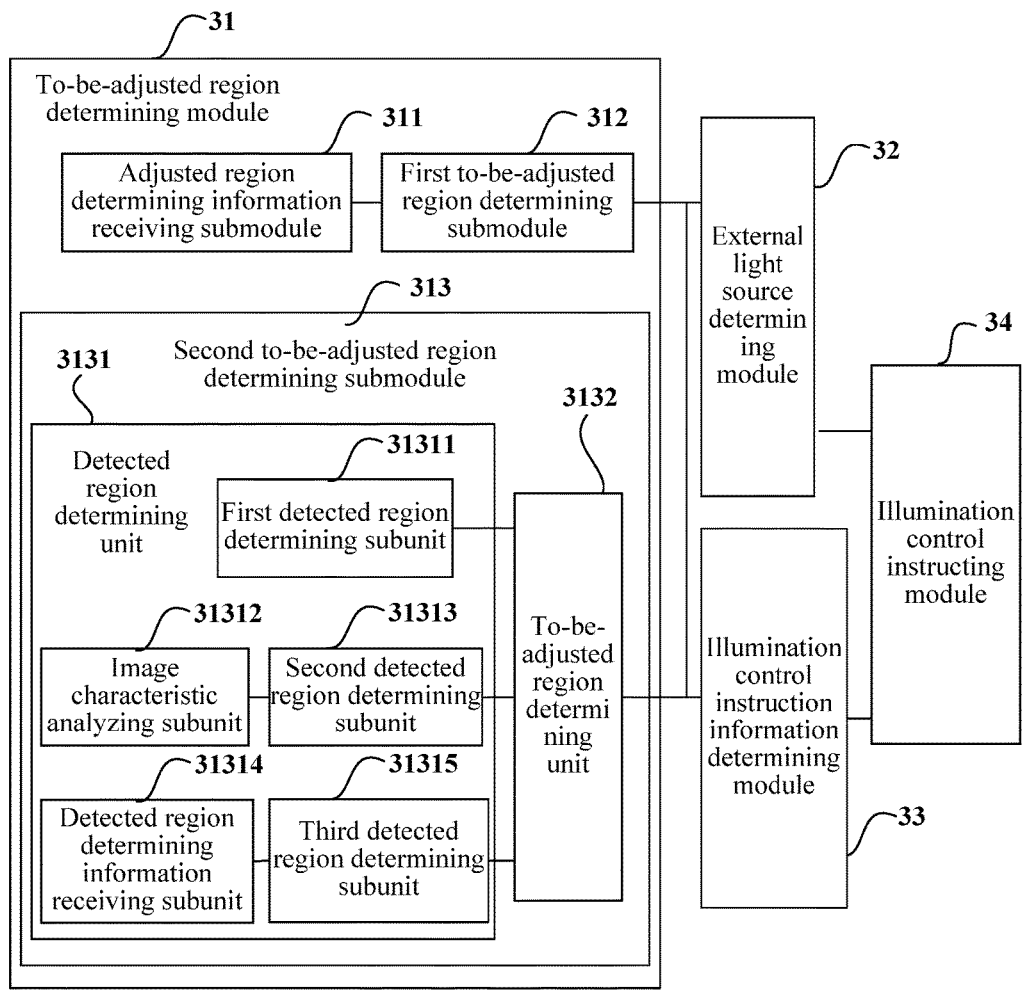
FIG. 4 is a schematic structural diagram of a second illumination control apparatus provided by an example embodiment of the present application.

FIG. 4 is a schematic structural diagram of a second illumination control apparatus provided by the embodiments of the present application. As shown in FIG. 4, optionally, the to-be-adjusted region determining module 31 comprises: an adjusted region determining information receiving submodule 311 and a first to-be-adjusted region determining submodule 312. The adjusted region determining information receiving submodule 311 is configured to receive to-be-adjusted region determining information. The first to-be-adjusted region determining submodule 312 is configured to determine the to-be-adjusted region according to the to-be-adjusted region determining information received. The solution makes it convenient for a user to select, according to actual needs, which regions in the photograph framing image need adjustment, so as to cause the illumination control to match the user requirement better, thereby helping to satisfy various user requirements, improve user's interests of photographing, and improve user's experience.

Optionally, the to-be-adjusted region determining module 31 comprises: a second to-be-adjusted region determining submodule 313. The second to-be-adjusted region determining submodule 313 is configured to determine the to-be-adjusted region according to an optical parameter analysis result of the photograph framing image. The solution facilitates implementation of automatic illumination control.

Optionally, the second to-be-adjusted region determining submodule 313 comprises: a detected region determining unit 3131 and a to-be-adjusted region determining unit 3132. The detected region determining unit 3131 is configured to determine at least one detected region in the photograph framing image. The to-be-adjusted region determining unit 3132 is configured to determine the to-be-adjusted region according to an optical parameter analysis result of the at least one detected region. The solution is simple and easy to implement, has strong universality, and further helps to satisfy various application requirements.

Optionally, the detected region determining unit 3131 comprises: a first detected region determining subunit 31311. The first detected region determining subunit 31311 is configured to determine the at least one detected region according to focusing information of the photograph framing image. The solution is simple and easy to implement, and helps to improve imaging quality of a focused image.

Optionally, the detected region determining unit 3131 comprises: an image characteristic analyzing subunit 31312 and a second detected region determining subunit 31313. The image characteristic analyzing subunit 31312 is configured to perform characteristic analysis on the photograph framing image. The second detected region determining subunit 31313 is configured to determine the at least one detected region according to a characteristic analysis result of the photograph framing image. The solution helps to specifically improve imaging quality of a characteristic region in the photograph framing image.

Optionally, the detected region determining unit 3131 comprises: a detected region determining information receiving subunit 31314 and a third detected region determining subunit 31315. The detected region determining information receiving subunit 31314 is configured to receive detected region determining information. The third detected region determining subunit 31315 is configured to determine the at least one detected region according to the detected region determining information received. The solution makes it convenient for a user to select, according to actual needs, which regions in the photograph framing image need adjustment, so as to cause determining of whether illumination control needs to be performed on the to-be-adjusted region to match a user requirement better, thereby helping to satisfy various user requirements and improving user's experience.

Figure 5:
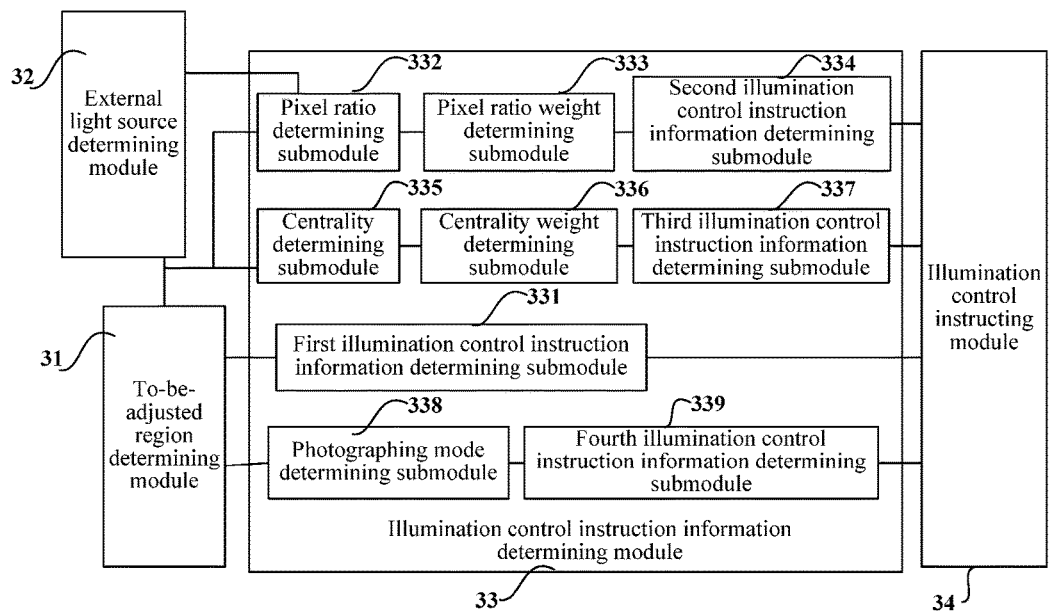
FIG. 5 is a schematic structural diagram of a third illumination control apparatus provided by an example embodiment of the present application.

FIG. 5 is a schematic structural diagram of a third illumination control apparatus provided by the embodiments of the present application. As shown in FIG. 5, optionally, the illumination control instruction information determining module 33 comprises a first illumination control instruction information determining submodule 331. The first illumination control instruction information determining submodule 331 is configured to determine the illumination control instruction information according to an optical parameter reference adjustment amplitude. The solution is simple and easy to implement.

Optionally, the illumination control instruction information determining module 33 comprises: a pixel ratio determining submodule 332, a pixel ratio weight determining submodule 333, and a second illumination control instruction information determining submodule 334. The pixel ratio determining submodule 332 is configured to determine a first ratio of a first pixel quantity to a total pixel quantity of the to-be-adjusted region. The first pixel quantity is a total quantity of all pixels of imaging rays that are received in the to-be-adjusted region and corresponding to the external light source. The pixel ratio weight determining submodule 333 is configured to determine a first weight according to the first ratio. The second illumination control instruction information determining submodule 334 is configured to determine the illumination control instruction information according to the first weight and an optical parameter reference adjustment amplitude. By using the solution, different optical adjustment schemes may be determined for different light sources according to the first ratio, thereby improving illumination control efficiency.

Optionally, the illumination control instruction information determining module 33 comprises: a centrality determining submodule 335, a centrality weight determining submodule 336, and a third illumination control instruction information determining submodule 337. The centrality determining submodule 335 is configured to determine a second weight according to an offset degree of the to-be-adjusted region relative to a center of the photograph framing image. The centrality weight determining submodule 336 is configured to determine a second weight according to an offset degree of pixel arrangement of imaging rays that are received in the to-be-adjusted region and corresponding to the external light source relative to a center of the to-be-adjusted region. The third illumination control instruction information determining submodule 337 is configured to determine the illumination control instruction information according to the second weight and an optical parameter reference adjustment amplitude. By using the solution, the second weight may be specifically determined according to different centrality degrees of the to-be-adjusted region relative to the photograph framing image, thereby improving illumination control efficiency.

Optionally, the illumination control instruction information determining module 33 comprises: a photographing mode determining submodule 338 and a fourth illumination control instruction information determining submodule 339. The photographing mode determining submodule is configured to determine a third weight according to a photographing mode of the photograph framing image. The fourth illumination control instruction information determining submodule 339 is configured to determine the illumination control instruction information according to the third weight and an optical parameter reference adjustment amplitude. The photographing mode of the photograph framing image is a current photographing mode of a device having a photographing function. By using the solution, the third weight may be specifically determined according to different photographing modes, thereby satisfying various user requirements.

Figure 6:
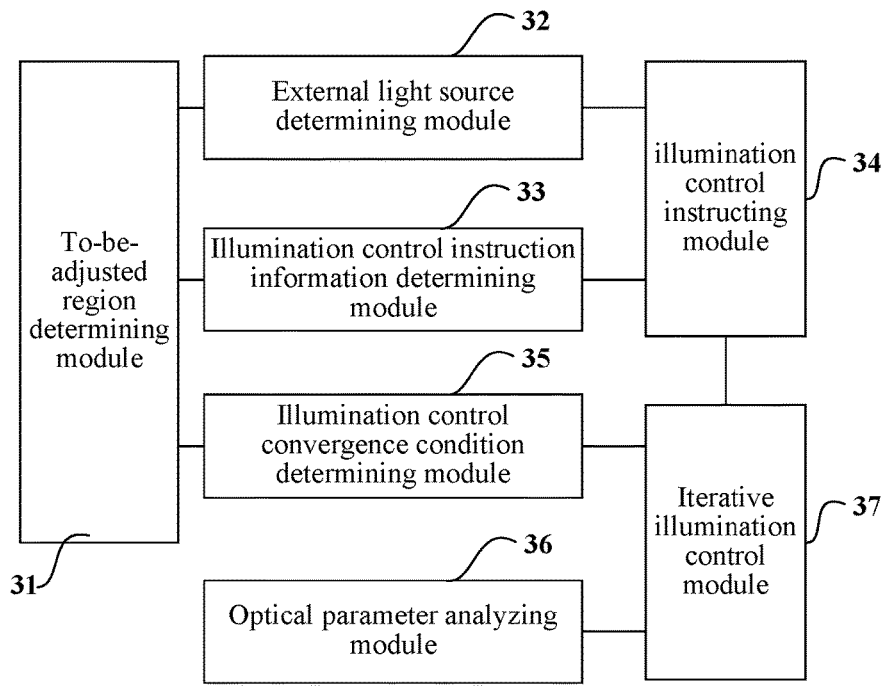
FIG. 6 is a schematic structural diagram of a fourth illumination control apparatus provided by an example embodiment of the present application.

FIG. 6 is a schematic structural diagram of a fourth illumination control apparatus provided by the embodiments of the present application. As shown in FIG. 6, the illumination control apparatus may further comprise: a illumination control convergence condition determining module 35, an optical parameter analyzing module 36, and an iterative illumination control module 37. The illumination control convergence condition determining module 35 is configured to determine a illumination control convergence condition of the to-be-adjusted region. The optical parameter analyzing module 36 is configured to acquire an optical parameter analysis result of the to-be-adjusted region after at least one optical adjustment is performed on the at least one external light source. The iterative illumination control module 37 is configured to: if the currently acquired optical parameter analysis result of the to-be-adjusted region does not satisfy the illumination control convergence condition, send the illumination control instruction information to the at least one external light source so as to instruct the at least one external light source to again perform adjustment and until a latest acquired optical parameter analysis result of the to-be-adjusted region satisfies the illumination control convergence condition, end optical adjustment control of the at least one external light source. The solution facilitates improvement of adjustment precision and decrease of an error rate by controlling an external light source to perform a plurality of iterative adjustments.

Figure 7:
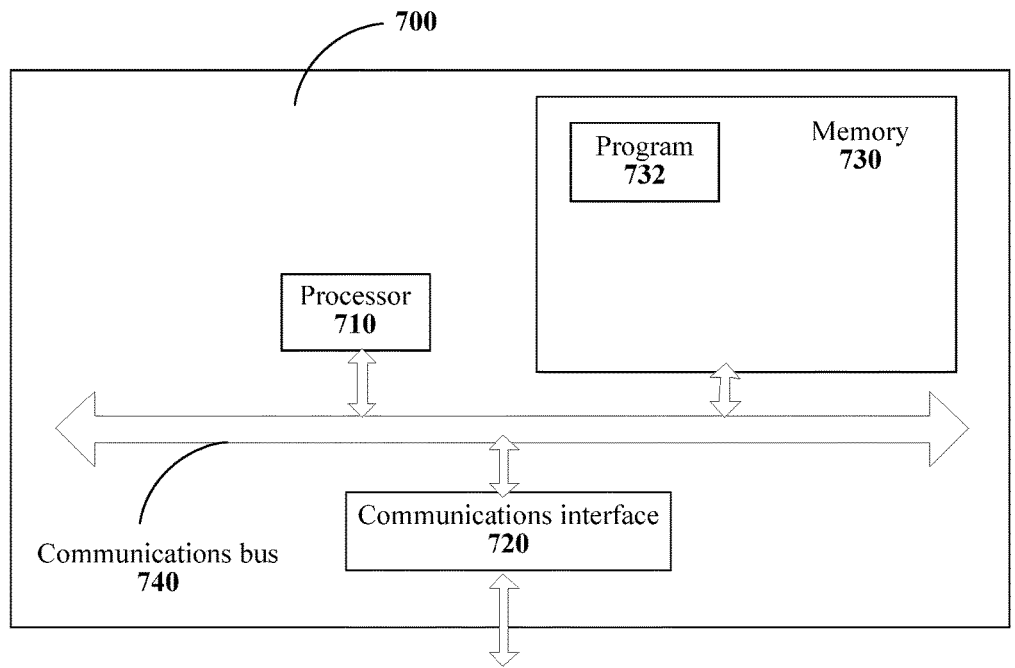
FIG. 7 is a schematic structural diagram of a fifth illumination control apparatus provided by an example embodiment of the present application.

FIG. 7 is a schematic structural diagram of a fifth illumination control apparatus provided by the embodiments of the present application. Specific implements of an illumination control apparatus 700 are not limited in the specific embodiments of the present application. As shown in FIG. 7, an illumination control apparatus 700 may comprise:

a processor 710, a communications interface 720, a memory 730, and a communications bus 740. Where:

The processor 710, the communications interface 720, and the memory 730 communicate with each other by using the communications bus 740.

The communications interface 720 is configured to communicate with a device having a communications function and an external light source, for example.

The processor 710 is configured to execute a program 732, and specifically may execute relevant steps in the embodiments of any one of the illumination control methods.

For example, the program 732 may comprise program code and the program code comprises a computer operation instruction.

The processor 710 may be a central processing unit (CPU), an application specific integrated circuit (ASIC), or one or more integrated circuits configured to implement the embodiments of the present application.

The memory 730 is configured to store the program 732. The memory 730 may comprise a random access memory (RAM), or may also comprise a non-volatile memory, for example, at least one magnetic disk memory.

For example, in an optional embodiment, the processor 710 may execute the following steps by executing the program 732: determining a to-be-adjusted region that needs optical parameter adjustment in a photograph framing image; determining, according to light source modulation information carried in received imaging rays corresponding to the to-be-adjusted region, an external light source that needs to be illumination controlled; determining illumination control instruction information of the to-be-adjusted region; and sending the illumination control instruction information to the determined external light source, so as to instruct the external light source to perform at least one optical adjustment according to the illumination control instruction information. In other optional embodiments, the processor 710 may further execute the steps mentioned in any one of the embodiments by executing the program 732, which is not described herein again.

For the example embodiment of the steps in the program 732, refer to the corresponding descriptions of corresponding steps, modules, submodules, and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 8:
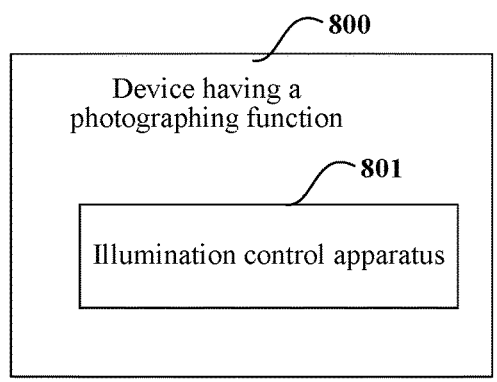
FIG. 8 is a schematic structural diagram of a device having a photographing function provided by an example embodiment of the present application.

FIG. 8 is a schematic structural diagram of a device having a photographing function provided in the embodiments of the present application. As shown in FIG. 8, the device having a photographing function 800 comprises an illumination control apparatus 801. The illumination control apparatus 801 may comprise the structure shown in any one of FIG. 3 to FIG. 7 and described in corresponding literal description.

The entity representation form of the device having a photographing function provided in the embodiments of the present application is not limited. For example, the device having a photographing function may be, but not limited to, a camera, a vidicon, and a mobile terminal having an imaging component. By using the device having a photographing function provided in the embodiments of the present application, which is integrated with the illumination control apparatus, an exposure adjustment function of the device having a photographing function may be combined with a function of illumination control of an external light source by the illumination control apparatus in a photographing process, thereby enhancing the overall illumination control effect and facilitating improvement in the imaging quality and the photographing effect.

In the embodiments of the present application, the serial numbers and/or sequences of the embodiments are only for illustrative purpose and do not indicate preferences of the embodiments. A special emphasis is laid on each embodiment. For a part that is not detailed in a certain embodiment, reference may be made to related description in another embodiment. Reference may be made to corresponding method embodiments for relevant description of implementation principle or process related to an apparatus, device or system embodiment, which is not again described in detail herein.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

It is obvious that all components (such as systems, subsystems, modules, submodules, units, and subunits) or steps, in the embodiments of the apparatuses, methods, and systems of the present application, may be separated, combined and/or separated and then recombined. The separated and/or recombined components are regarded as equivalent solutions of the present application. Meanwhile, in the above description of the detailed embodiments of the present application, a feature described and/or shown with respect to one embodiment may be used in one or more other implementations in a same or similar form, and is combined with features in the other implementations, or replaces a feature of in the other implementations.

It should be emphasized that the term "comprise/include" refers to existence of features, elements, steps, or components during use in the specification, but does not exclude existence or attachment of one or more other features, elements, steps, or components.

Finally, it should be noted that: the above example embodiments are only used to describe the present application, rather than limit the present application; various alterations and variants can be made by a person of ordinary skill in the art without departing from the spirit and scope of the present application, so all equivalent technical solutions also belong to the scope of the present application, and the scope of patent protection of the present application should be defined by claims.

What is claimed is:

1. A method, comprising:
    determining, by a system comprising a processor, a to-be-adjusted region for optical parameter adjustment in a photograph framing image;
    determining, by the system according to light source modulation information carried in received imaging rays corresponding to the to-be-adjusted region, mappings between at least one image pixel of the to-be-adjusted region and one or more external light source;
    determining, by the system, at least one external light source of the one or more external light sources to be illumination controlled according to the mappings;
    determining, by the system, illumination control instruction information of the to-be-adjusted region; and
    sending, by the system, the illumination control instruction information to the at least one external light source to instruct the at least one external light source to perform at least one optical adjustment according to the illumination control instruction information.

2. The method of claim 1, wherein the determining the to-be-adjusted region comprises:
    receiving to-be-adjusted region determining information; and
    determining the to-be-adjusted region according to the to-be-adjusted region determining information.

3. The method of claim 1, wherein the determining the to-be-adjusted region comprises:
    determining the to-be-adjusted region according to a first result of an optical parameter analysis of the photograph framing image.

4. The method of claim 3, wherein the determining the to-be-adjusted region further comprises:
    determining at least one detected region in the photograph framing image; and
    determining the to-be-adjusted region according to a second result of an optical parameter analysis of the at least one detected region.

5. The method of claim 4, wherein the determining the at least one detected region comprises:
    determining the at least one detected region according to focusing information of the photograph framing image.

6. The method of claim 4, wherein the determining the at least one detected region comprises:
    performing characteristic analysis on the photograph framing image; and
    determining the at least one detected region according to a result of the characteristic analysis of the photograph framing image.

7. The method of claim 4, wherein the determining the at least one detected region comprises:
    receiving detected region determining information; and
    determining the at least one detected region according to the detected region determining information.

8. The method of claim 1, wherein the optical parameter comprises at least one of: contrast, luminance, or color temperature.

9. The method of claim 1, wherein the determining the illumination control instruction information of the to-be-adjusted region comprises:
    determining the illumination control instruction information according to an optical parameter reference adjustment amplitude.

10. The method of claim 1, wherein the determining the illumination control instruction information of the to-be-adjusted region comprises:
    determining a first ratio of a first pixel quantity to a total pixel quantity of the to-be-adjusted region, wherein the first pixel quantity is a total quantity of all pixels of imaging rays that are received in the to-be-adjusted region and correspond to the external light source;
    determining a weight according to the first ratio; and
    determining the illumination control instruction information according to the weight and an optical parameter reference adjustment amplitude.

11. The method of claim 1, wherein the determining the illumination control instruction information of the to-be-adjusted region comprises:
    determining a weight according to an offset degree of pixel distribution of imaging rays that are received in the to-be-adjusted region and correspond to the external light source relative to a center of the to-be-adjusted region; and determining the illumination control instruction information according to the weight and an optical parameter reference adjustment amplitude.

12. The method of claim 1, wherein the determining the illumination control instruction information of the to-be-adjusted region comprises:
   determining a weight according to a photographing mode of the photograph framing image; and
   determining the illumination control instruction information according to the weight and an optical parameter reference adjustment amplitude.

13. The method of claim 1, further comprising:
   determining, by the system, an illumination control convergence condition of the to-be-adjusted region;
   acquiring, by the system, at least one optical parameter analysis result of the to-be-adjusted region after at least one optical adjustment is performed on the at least one external light source; and
   processing, by the system, respective optical parameter analysis results of the at least one optical parameter analysis result comprising:
      in response to an optical parameter analysis result of the at least one optical parameter analysis result being determined not to satisfy the illumination control convergence condition, sending the illumination control instruction information to the at least one external light source to instruct the at least one external light source to perform adjustment, and
      in response to the optical parameter analysis result being determined to satisfy the illumination control convergence condition, ending optical adjustment control of the at least one external light source.

14. An apparatus, comprising:
   a memory that stores executable modules; and
   a processor, couple to the memory, that executes or facilitates execution of the executable modules, the executable modules comprising:
      a to-be-adjusted region determining module configured to determine a to-be-adjusted region for optical parameter adjustment in a photograph framing image;
      an external light source determining module configured to:
         determine, according to light source modulation information received in imaging rays corresponding to the to-be-adjusted region, mappings between at least one image pixel of the to-be-adjusted region and one or more external light sources, and
         determine at least one external light source of the one or more external light sources to be illumination controlled according to the mappings;
      an illumination control instruction information determining module configured to determine illumination control instruction information associated with the to-be-adjusted region; and
      an illumination control instructing module configured to send the illumination control instruction information to the at least one external light source, thereby instructing the at least one external light source to perform at least one optical adjustment according to the illumination control instruction information.

15. The apparatus of claim 14, wherein the to-be-adjusted region determining module comprises:
   an adjusted region determining information receiving submodule configured to receive to-be-adjusted region determining information; and
   a first to-be-adjusted region determining submodule configured to determine the to-be-adjusted region according to the to-be-adjusted region determining information.

16. The apparatus of claim 14, wherein the to-be-adjusted region determining module comprises:
   a second to-be-adjusted region determining submodule configured to determine the to-be-adjusted region according to an optical parameter analysis result of the photograph framing image.

17. The apparatus of claim 16, wherein the to-be-adjusted region determining module further comprises:
   a detected region determining unit configured to determine at least one detected region in the photograph framing image; and
   a to-be-adjusted region determining unit configured to determine the to-be-adjusted region according to an optical parameter analysis result of the at least one detected region.

18. The apparatus of claim 17, wherein the detected region determining unit comprises:
   a first detected region determining subunit configured to determine the at least one detected region according to focusing information of the photograph framing image.

19. The apparatus of claim 17, wherein the detected region determining unit comprises:
   an image characteristic analyzing subunit configured to perform characteristic analysis on the photograph framing image; and
   a second detected region determining subunit configured to determine the at least one detected region according to a characteristic analysis result of the photograph framing image.

20. The apparatus of claim 19, wherein the detected region determining unit further comprises:
   a detected region determining information receiving subunit configured to receive detected region determining information; and
   a third detected region determining subunit configured to determine the at least one detected region according to the detected region determining information received.

21. The apparatus of claim 14, wherein the illumination control instruction information determining module comprises:
   a first illumination control instruction information determining submodule configured to determine the illumination control instruction information according to an optical parameter reference adjustment amplitude.

22. The apparatus of claim 14, wherein the illumination control instruction information determining module comprises:
   a pixel ratio determining submodule configured to determine a first ratio of a first pixel quantity to a total pixel quantity of the to-be-adjusted region, wherein the first pixel quantity is a total quantity of all pixels of imaging rays that are received in the to-be-adjusted region and corresponding to the external light source;
   a pixel ratio weight determining submodule configured to determine a weight according to the first ratio; and
   a second illumination control instruction information determining submodule configured to determine the illumination control instruction information according to the weight and an optical parameter reference adjustment amplitude.

23. The apparatus of claim 14, wherein the illumination control instruction information determining module comprises:

a centrality determining submodule configured to determine a weight according to an offset degree of the to-be-adjusted region relative to a center of the photograph framing image;

a centrality weight determining submodule configured to determine the weight according to an offset degree of pixel distribution of imaging rays that are received in the to-be-adjusted region and corresponding to the external light source relative to a center of the to-be-adjusted region; and a third illumination control instruction information determining submodule configured to determine the illumination control instruction information according to the weight and an optical parameter reference adjustment amplitude.

24. The apparatus of claim 14, wherein the illumination control instruction information determining module comprises:

a photographing mode determining submodule configured to determine a weight according to a photographing mode of the photograph framing image; and a fourth illumination control instruction information determining submodule configured to determine the illumination control instruction information according to the weight and an optical parameter reference adjustment amplitude.

25. The apparatus of claim 14, wherein the executable modules further comprise:

an illumination control convergence condition determining module configured to determine an illumination control convergence condition of the to-be-adjusted region;

an optical parameter analyzing module configured to acquire at least one optical parameter analysis result of the to-be-adjusted region after at least one optical adjustment is performed on the at least one external light source; and an iterative illumination control module, configured to process respective optical parameter analysis results of the at least one optical parameter analysis result comprising:

in response to an optical parameter analysis result of the at least one optical parameter analysis result not satisfying the illumination control convergence condition, send the illumination control instruction information to the at least one external light source, thereby instructing the at least one external light source to again perform adjustment, and in response to the optical parameter analysis result satisfying the illumination control convergence condition, end optical adjustment control of the at least one external light source.

26. The apparatus of claim 14, wherein the apparatus is a device having a photographing function.

27. A non-transitory computer-readable medium having instructions stored thereon that, in response to execution, causes an apparatus comprising a processor to perform operations comprising:

determining a to-be-adjusted region for optical parameter adjustment in a photograph framing image;

determining, according to light source modulation information carried in received imaging rays corresponding to the to-be-adjusted region, mappings between at least one image pixel of the to-be-adjusted region and at least one external light source;

determining an external light source of the at least one external light source to be illumination controlled based on the mappings;

determining illumination control instruction information of the to-be-adjusted region; and sending the illumination control instruction information to the external light source, so as to instruct the external light source to perform an optical adjustment according to the illumination control instruction information.

28. An apparatus, characterized by comprising a processor and a memory, the memory storing executable instructions, the processor being connected to the memory via a communication bus, and when the apparatus for controlling task migration operates, the processor executing or facilitating execution of the executable instructions stored in the memory causes the apparatus to perform operations, comprising:

determining a to-be-adjusted region that needs optical parameter adjustment in a photograph framing image;

determining, according to light source modulation information carried in received imaging rays corresponding to the to-be-adjusted region, mappings between at least one image pixel of the to-be-adjusted region and one or more external light sources;

determining at least one external light source of the one or more external light sources that needs to be illumination controlled according to the mappings;

determining illumination control instruction information of the to-be-adjusted region; and sending the illumination control instruction information to the at least one external light source determined, wherein the illumination control instruction information instructs the at least one external light source to perform at least one optical adjustment according to the illumination control instruction information.

* * * * *